US011113066B2

(12) United States Patent
Bhat et al.

(10) Patent No.: US 11,113,066 B2
(45) Date of Patent: Sep. 7, 2021

(54) PREDICTING A BRANCH INSTRUCTION CLASSIFIED AS SIMPLE OR HARD TO PREDICT BASED ON A CONFIDENCE COUNTER IN A BRANCH TYPE TABLE

(71) Applicant: International Business Machines Corporation, Armonk, NY (US)

(72) Inventors: Puneeth A. H. Bhat, Bangalore (IN); Satish Kumar Sadasivam, Erode (IN); Shruti Saxena, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/865,719

(22) Filed: Jan. 9, 2018

(65) Prior Publication Data
US 2019/0213008 A1    Jul. 11, 2019

(51) Int. Cl.
*G06F 9/38*    (2018.01)

(52) U.S. Cl.
CPC .......... *G06F 9/3844* (2013.01); *G06F 9/3806* (2013.01)

(58) Field of Classification Search
CPC .... G06F 9/3844; G06F 9/3846; G06F 9/3848; G06F 9/3806
See application file for complete search history.

(56) References Cited

U.S. PATENT DOCUMENTS

| 5,822,577 | A | | 10/1998 | Ekanadham et al. |
| 5,909,573 | A | * | 6/1999 | Sheaffer ................. G06F 9/325 |
| | | | | 712/240 |
| 5,933,628 | A | * | 8/1999 | Chang ................... G06F 8/4451 |
| | | | | 712/233 |
| 6,427,206 | B1 | | 7/2002 | Yeh et al. |
| 7,409,535 | B2 | * | 8/2008 | Park ..................... G06F 9/30061 |
| | | | | 712/235 |
| 7,673,123 | B2 | * | 3/2010 | Hastie ................... G06F 9/3844 |
| | | | | 712/239 |
| 7,814,298 | B1 | | 10/2010 | Thaik et al. |
| 9,201,654 | B2 | | 12/2015 | Cantin et al. |
| 9,477,478 | B2 | * | 10/2016 | Kothari ................ G06F 9/3806 |
| 9,495,157 | B1 | | 11/2016 | Bradbury et al. |

(Continued)

FOREIGN PATENT DOCUMENTS

GB    2517876 B    3/2015

OTHER PUBLICATIONS

Chang et al., "Branch Classification: a New Mechanism for Improving Branch Predictor Performance", 1994, pp. 22-31.*

(Continued)

*Primary Examiner* — David J. Huisman
(74) *Attorney, Agent, or Firm* — Scully, Scott, Murphy & Presser, P.C.

(57) ABSTRACT

A processor including a processor pipeline having one or more execution units configured to execute branch instructions, a branch predictor coupled to the processor pipeline and configured to predict a branch instruction outcome, and a branch classification unit coupled to the processor pipeline and the branch predictor. The branch classification unit is configured to, in response to detecting a branch instruction, classify the branch instruction as at least one of the following: a simple branch and a hard-to-predict branch. The branch classification unit includes a direct mapped branch type table (BTT) and a branch classification table (BCT).

20 Claims, 10 Drawing Sheets

(56) References Cited

U.S. PATENT DOCUMENTS

| | | |
|---|---|---|
| 9,507,598 B1 | 11/2016 | Bonanno et al. |
| 9,563,430 B2 | 2/2017 | Bonanno et al. |
| 2005/0257036 A1* | 11/2005 | Prasky .................. G06F 9/3806 712/239 |
| 2013/0198490 A1* | 8/2013 | Tran ...................... G06F 9/3804 712/205 |
| 2014/0229721 A1 | 8/2014 | Forsyth et al. |
| 2017/0068539 A1 | 3/2017 | Dundas et al. |
| 2017/0115988 A1 | 4/2017 | Jung |
| 2018/0314524 A1* | 11/2018 | Keskin .................. G06F 9/3806 |

OTHER PUBLICATIONS

Driesen et al., "The Cascaded Predictor: Economic and Adaptive Branch Target Prediction", Jun. 22, 1998, pp. 1-16.*

Juang, "Classification-Based Hybrid Branch Prediction", Mar. 24, 2000, 62 pages.*

* cited by examiner

412

|  | Actual Taken | Actual Not Taken |
|---|---|---|
| Predicted Taken | Taken/Taken (T/T) 412(a) | Not-Taken/Taken (NT/T) 412(c) |
| Predicted Not-Taken | Taken/Not-Taken (T/NT) 412(b) | Not-Taken/Not-Taken (NT/NT) 412(d) |

FIG. 5

PREDICTING A BRANCH INSTRUCTION CLASSIFIED AS SIMPLE OR HARD TO PREDICT BASED ON A CONFIDENCE COUNTER IN A BRANCH TYPE TABLE

BACKGROUND

The present invention relates to executions in a processor and more specifically to detecting hard-to-predict branches to increase the efficiency of a processor executing branch instructions.

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

SUMMARY OF THE INVENTION

The summary of the disclosure is given to aid understanding of the computer processing system and method of classifying branch instructions, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

The present invention generally provides improved methods and systems for classifying branch instructions in a processor. In one embodiment, the system is a computing system that includes a memory and a processor. The processor also includes a processor pipeline comprising one or more execution units configured to execute branch instructions, a branch predictor coupled to the processor pipeline and configured to predict a branch instruction outcome, and a branch classification unit coupled to the processor pipeline and the branch predictor. The branch classification unit includes a direct mapped branch type table (BTT) and a branch classification table (BCT), and is configured to classify the branch instruction as at least one of the following: a simple branch and a hard-to-predict branch.

In an embodiment, the BCT may comprise one or more entries that each include one or more fields configured to record an actual behavior and a predicted behavior of a branch instruction. The one or more entries may be organized as a direct-mapped table, a fully associative table, and/or an n-way set associative table. In an embodiment, the one or more fields may include a tag field, a confusion matrix, a current branch outcome field, a branch switch count field, and a usefulness bits field. Alternatively, the one or more fields may include a tag field, a correct prediction field, a misprediction field, and a usefulness bits field. In an embodiment, the BTT may comprise one or more entries that each include a branch type field and a confidence counter field.

In one or more embodiments, in response to detecting a branch instruction, the branch classification unit may be configured to determine a type of the detected branch instruction by extracting an index from an instruction address of the detected branch instruction, using the index to identify an entry corresponding to the detected branch instruction in the BTT, and determining whether a value in the confidence counter field in the identified entry is greater than 0. If the value in the confidence counter field in the identified entry is greater than 0, determining the type of the detected branch instruction using a value in the branch type field of the identified entry. In certain embodiments, the branch classification unit is further configured to, if the value in the confidence counter field in the identified entry is greater than 0, update the value in the confidence counter field by: predicting an outcome of the detected branch instruction by the branch predictor, executing the detected branch instruction by the processor pipeline, and updating the value in the confidence counter field based on an actual behavior and a predicted behavior of the detected branch instruction. The value in the confidence counter field may be updated using one or more of the following rules: increment the value in the confidence counter field by 1 if the branch type field indicates simple and a predicted branch direction matches an actual branch direction, increment the value in the confidence counter field by 1 if the branch type field indicates hard to predict and the predicted branch direction does not match the actual branch direction, decrement the value in the confidence counter field by 1 if the branch type field indicates simple and the predicted branch direction does not match the actual branch direction, and/or decrement the value in the confidence counter field by 1 if the branch type field indicates hard to predict and the predicted branch direction matches the actual branch direction.

Optionally, if the value in the confidence counter field in the identified entry is equal to 0, the branch classification unit may use the BCT to classify the detected branch instruction. In an embodiment, the BCT is configured to classify the branch instruction by predicting an outcome of the detected branch instruction by the branch predictor, executing the detected branch instruction by the processor pipeline, updating one or more fields of the BCT to record an actual behavior and a predicted behavior of the detected branch instruction, computing a set of classifier parameters using values included in the updated BCT, classifying the branch instruction based on the set of classifier parameters, and updating the branch type field in the BTT.

In an embodiment, the branch predictor may be used to predict an outcome of the detected branch instruction only if the branch instruction is classified as simple.

BRIEF DESCRIPTION OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

FIG. 5 illustrates a confusion matrix in accordance with an embodiment.

DETAILED DESCRIPTION

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
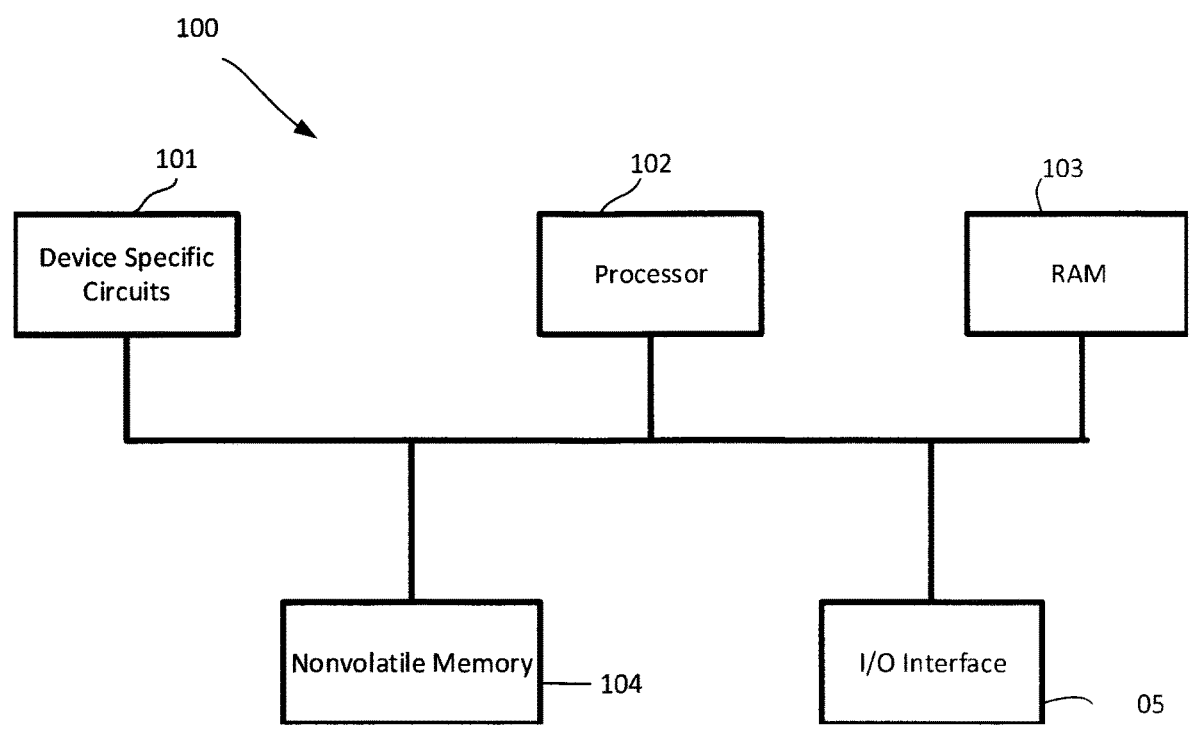
FIG. 1 depicts a general computing or data processing system in accordance with one embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
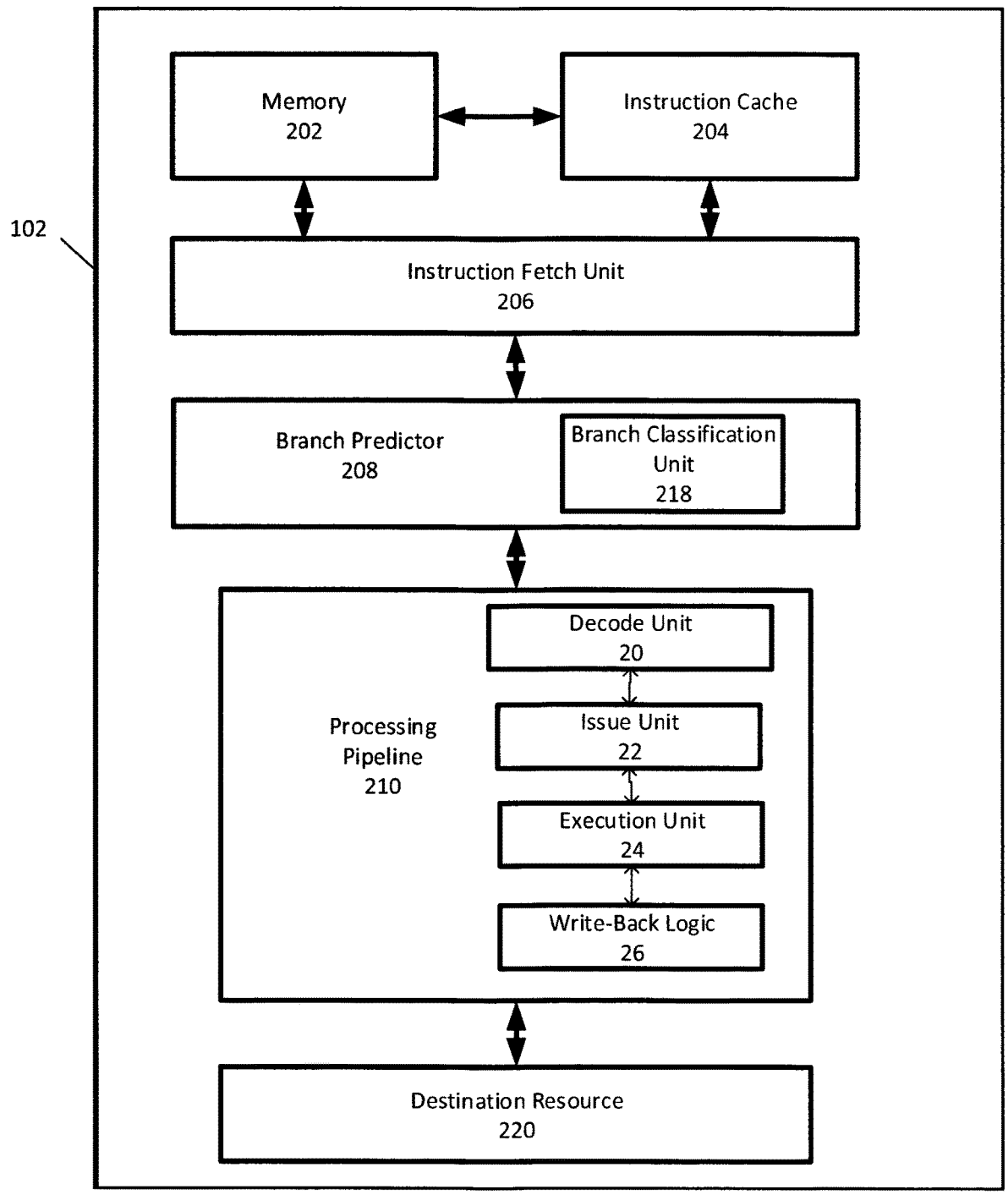
FIG. 2 depicts a block diagram of a processor in accordance with an embodiment.

FIG. 2 depicts a block diagram of a processor 102 according to an embodiment. The processor 102 includes a memory 202, an instruction cache 204, an instruction fetch unit 206, a branch predictor 208, a branch classification unit 218, and a processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to store instructions in an 8-way set associative structure. Alternatively, any other desired configuration and size may be employed. For example, instruction cache 204 may be implemented as a fully associative, set associative, or direct mapped configuration. In an embodiment, the processor 102 may also include a program counter (PC) (not shown) that indicates where the computing device is in its program sequence, i.e., PC is an instruction address for a fetched branch instruction.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 102. The execution unit 24 may include a plurality of execution units, such as fixed-point execution units, floating-point execution units, load/store execution units, and vector multimedia execution units. The execution unit 24 may also include a count cache to predict branch to count register (bcctr) instructions. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

Branch instructions can be either unconditional, meaning that the branch is taken every time that the instruction is encountered in the program, or conditional, meaning that the branch is either taken or not taken, depending upon a condition. Processors typically provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. These types of branches can significantly reduce the performance of a pipeline processor since they may interrupt the steady supply of instructions to the execution hardware. Branch predictors attempt to predict the outcome of conditional branch instructions in a program before the branch instruction is executed. If a branch is mispredicted, all of the speculative work, beyond the point in the program where the branch is encountered, must be discarded. Therefore, a highly-accurate branch prediction mechanism is beneficial to a high-performance, pipelined processor where branch prediction may be used to predict the outcome of conditional branch instructions. For example, when a conditional branch instruction is encountered, the processor may predict which instruction will be executed after the outcome of the branch condition is known. Then, instead of stalling the pipeline when the conditional branch instruction is issued, the processor may continue issuing instructions beginning with the predicted next instruction.

In an embodiment, a variety of suitable branch prediction algorithms may be employed by the branch predictor 208. The branch predictor 208 may include any combination of primary branch prediction structures or circuits, such as a branch target buffer (BTB), a branch history table (BHT), one or more pattern history tables (PHT), or the like. The BTB may be set associative and include multiple sets (columns) of BTB entries and each BTB entry may include, for example, a branch address tag and a predicted target address. The BTB may also be direct mapped or fully-associative. The BTB may be a global buffer that records the outcome of every branch that executes, or it may be a per-branch buffer that records only the past history of the same branch. The BHT may hold branch history information that indicates whether a branch is predicted as taken or not taken. The BHT can also include prediction strength indicators for BHT direction predictions (e.g., strong not taken, weak not taken, weak taken, and strong taken). The BHT may be indexed based on an instruction address. A PHT may hold prediction strength indicators for direction predictions and tags associated with branch prediction patterns. To predict a branch in existing branch prediction hardware, the branch instruction's address is combined with the current value of the branch history. This can be a global branch history of the last k branch outcomes (such as a PHT) or a table that has a per-branch history, i.e. the last k outcomes of the same branch (such as a BHT). The resulting value is used to index into a predictor table in order to read off the prediction. After the branch actually executes, the outcome of the branch is shifted into the BTB.

Many early implementations of branch predictors used simple history bits and counter-based schemes that provide branch prediction accuracy of about 85-90%. Attempts to improve upon the accuracy of simple 2-bit counter schemes have included predictors that relate the sub-history information of a branch to the most recently executed branches via a shift register. Among the methods used to predict branches are local branch prediction and global branch prediction. Local branch prediction involves making a prediction based on the behavior of a particular branch the past few times it was executed. Local branch prediction is effective for branches exhibiting repetitive patterns. On the other hand, global branch prediction involves making a branch prediction based on the history of the last few branches to have been executed. Global branch prediction is useful when the behavior of a branch is related to the behavior of the prior executed branches.

While history-based dynamic branch predictors have reached high prediction accuracy, certain branch types continue to mispredict. These are branches that may depend on longer history length, have loaded data values or exhibit random behavior (e.g., multi-target indirect branches and data-dependent direct and indirect branches). These are hard-to-predict branches since their outcome does not always exhibit repeatable patterns and trying to predict the outcome of such branches using typical branch predictors result in bottlenecks and low-performance.

Classifying branches to identify such hard-to-predict branches and selecting a branch predictor based on the type of branch may improve accuracy and performance. As such, in an embodiment, the branch predictor 208 also includes a branch classification unit 218 (BCU). Alternatively and/or additionally, the BCU 218 may be located separately from the branch predictor 208. In an embodiment, the branch predictor 208 and/or the BCU 218 may be included in the instruction fetch unit and/or the processor pipeline. The BCU 218 is an example of a processing circuit configured to implement branch classification with confidence and usefulness tracking.

Figure 3:
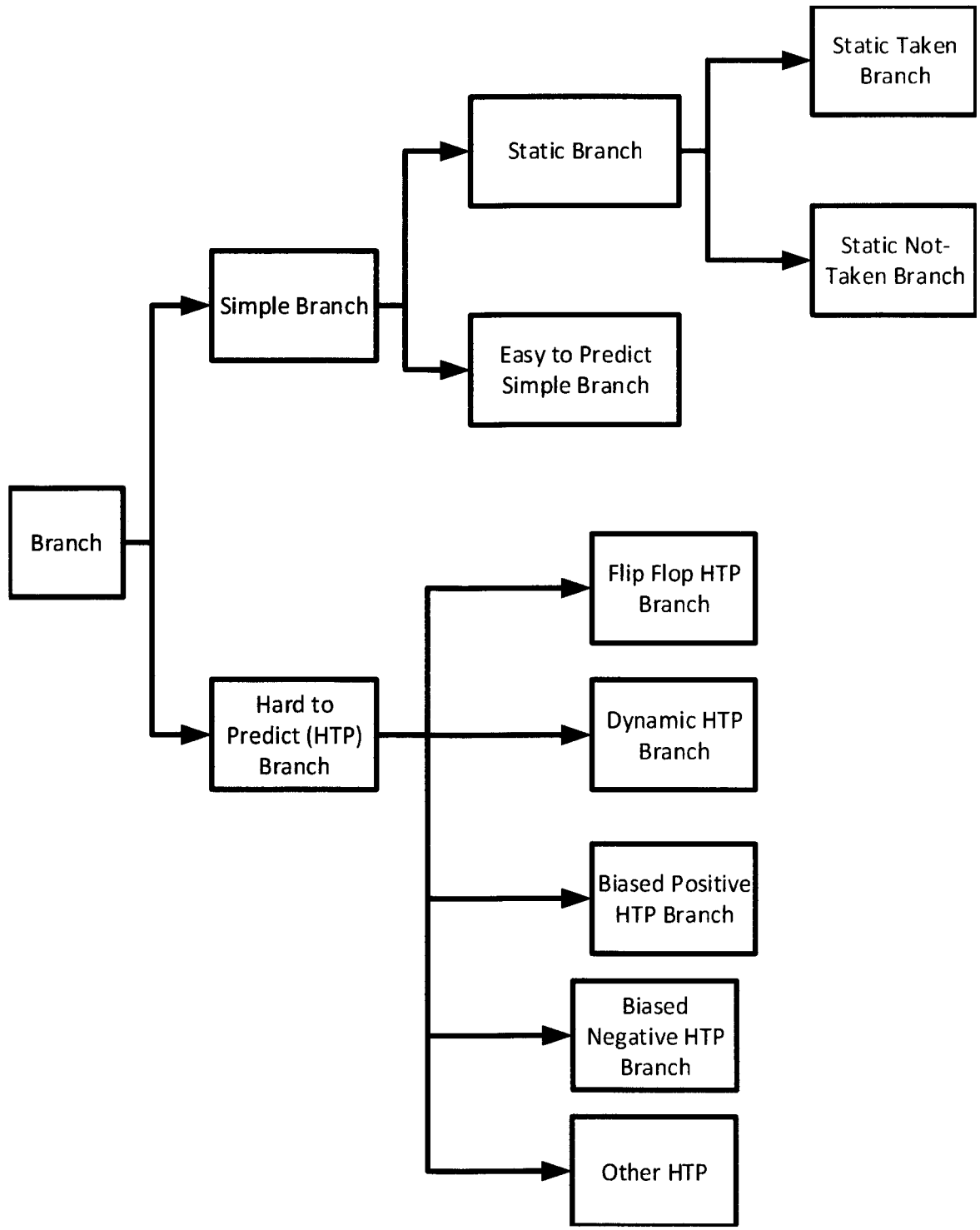
FIG. 3 illustrates branch classes or types used by a branch classification unit in accordance with an embodiment.

In an embodiment, the BCU 218 may apply a set of heuristics to implement branch classification by assigning all incoming branch instructions to one of the branch types illustrated in FIG. 3. Branch classification may partition branches into a set of branch classes statically and/or dynamically by assigning similar behavior to the same class of branches. Hence, by analyzing the behavior of a class of branches, branch prediction accuracy for that class may be optimized for a given hardware. For example, prediction accuracy may be increased by associating each branch class with a suitable predictor for that class. Specifically, resources may be allocated such that a simple predictor may be used to predict simple branches and a more complex predictor may be used to predict hard-to-predict branches. It should be understood that the heuristics described in this disclosure are the result of profiling branches in an industry standard CPU benchmark. Different classes of branches have common characteristics (such as number of branch miss-predictions) that produce the above-listed heuristics. It is appreciated that other embodiments may apply a different set of heuristics. In still other implementations, a subset of the above-listed heuristics may be utilized, for example, for classifying branches into hard to predict and simple branches only.

Branch classes or types illustrated in FIG. 3 are classified based on the dynamic branch execution and/or prediction behavior. As shown in FIG. 3, in an embodiment, based on their prediction accuracy, branches may be classified into simple branches and hard-to-predict (HTP) branches. Simple branches are branches whose outcome may be predicted with a high level of accuracy, and HTP branches are branches whose outcome may be predicted with a low level of accuracy. Simple branches may further be classified into static branches and easy-to-predict simple branches. Static branches are unidirectional branches and may be static taken (i.e., unidirectional taken) or static non-taken (i.e., unidirectional non-taken) branches. Simple branches are not static but may be predicted with a high accuracy are easy-to-predict simple branches. HTP branches may be classified into flip flop HTP branches (dynamic in nature that have a high switch count probability value of at least about 0.8-0.9); dynamic HTP branches (dynamic branches that have a switch count probability that is less than that of flip flop HTP branches); biased positive HTP branches (HTP that have a high miss-prediction rate and are biased towards the taken direction); biased negative HTP branches (HTP that have a high miss-prediction rate and are biased towards the not-taken direction); and normal HTP (all other types of HTP branches). It should be understood that the branch classification unit may be used to classify branch instructions into types or classes that are different and/or a subset of those illustrated in FIG. 3. For example, in an embodiment, the BCU may classify branches into two broad categories: HTP branches and simple branches, and may not sub classify the HTP branches and the simple branches.

Figure 4A:
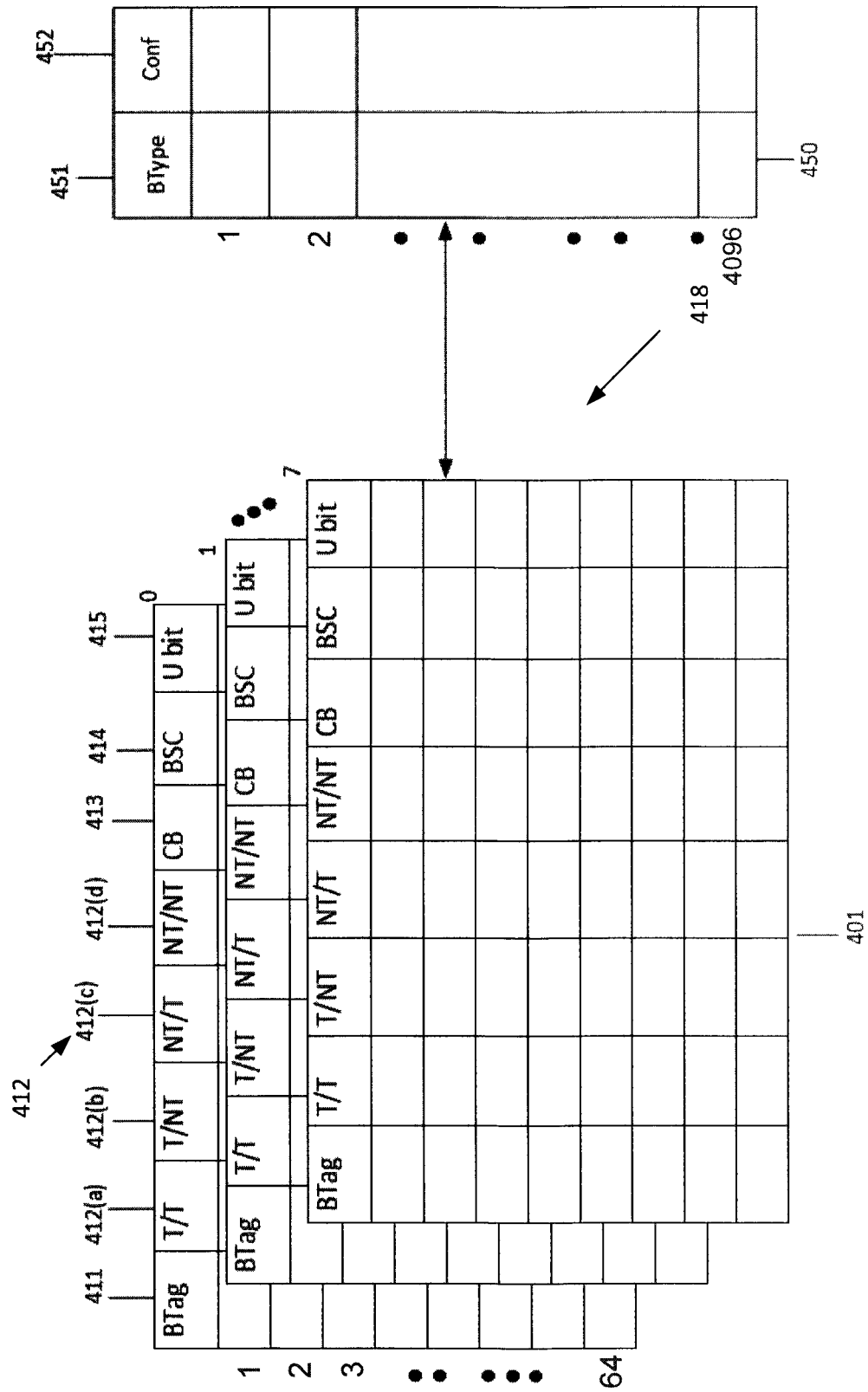
FIG. 4A depicts a branch classification unit in accordance with an embodiment.
Figure 4B:
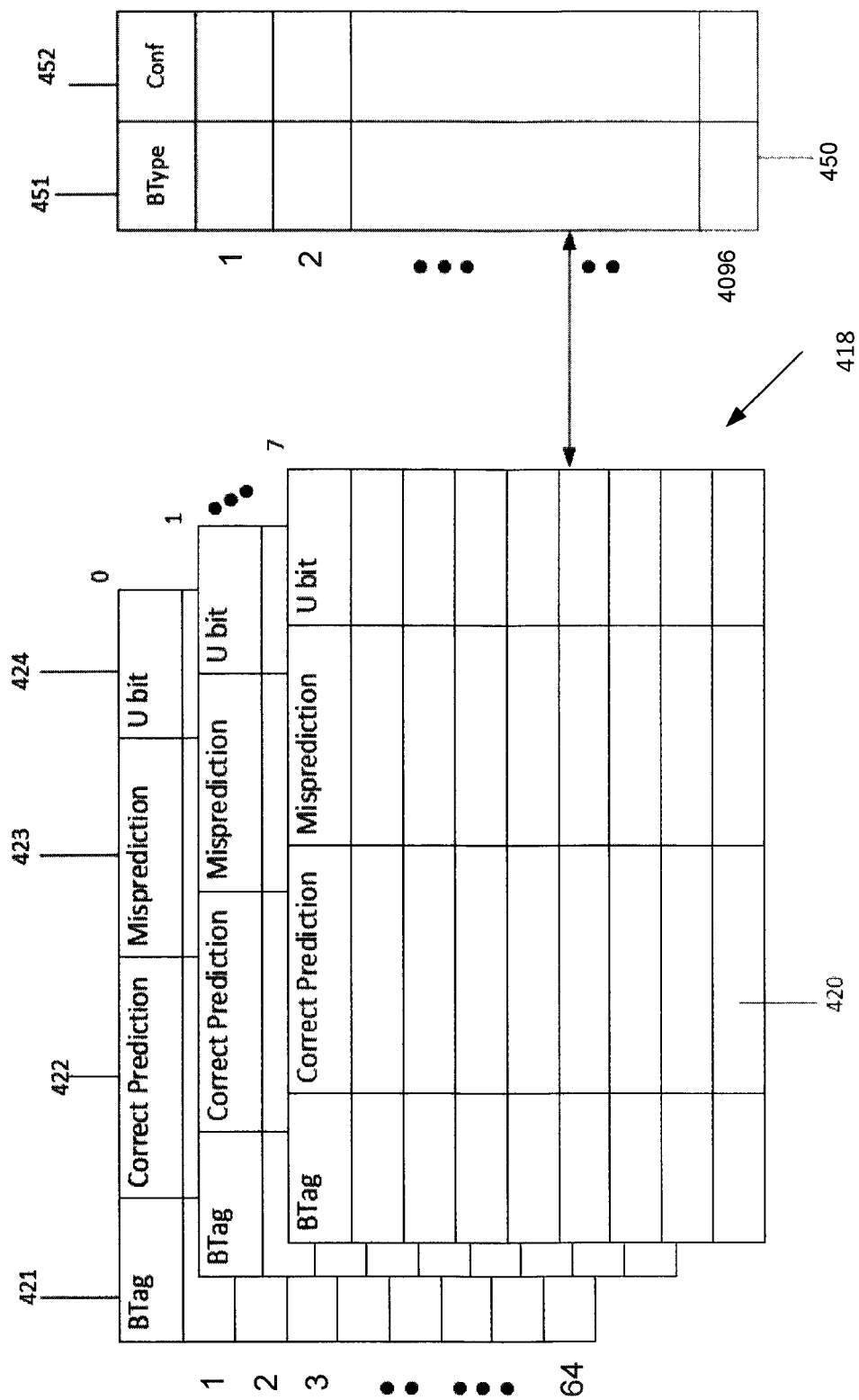
FIG. 4B depicts a branch classification unit in accordance with another embodiment.

FIGS. 4A and 4B illustrate two embodiments of BCU 218 that may be used to determine and track the branch type for branch instructions before being forwarded to the branch predictor 208 (i.e., for detecting HTP branch instructions), according to an embodiment. In an embodiment, BCU 218 includes a branch classification table (BCT) 401 and a branch type table (BTT) 450. As discussed below in detail, the BCT 401 may be an n-way set associative table structure which caches full classification information and logic for the branch instructions corresponding to a classification scheme, but for a limited number of branch instructions (for e.g., 64 entries). In contrast, the BTT 450 may be a direct-mapped table structure that caches limited classification information (2 fields) for a much larger number of branch instructions (for e.g., 4096 entries). As each branch instruction is fetched and decoded, its address is used to look-up a corresponding entry in BTT 450, and then BCT 401 based classification may only be invoked for certain branch instructions as discussed below. Through proper organization of these two cache structures individually, and proper combining and coordination of their joint operation, an overall performance benefit is achieved approximating that of a single cache structure with the classification information width of BCT 401 and a number of cache entries equal to that of BTT 450. The amount of hardware circuitry required to implement the two-level hybrid cache structure is much less than for a single deep and wide cache structure. Moreover, use of the BTT 450 as an initial classification step also helps decrease the latency associated with the classification process because of the direct-mapped nature of the BTT that allows for direct indexing of the instruction address to retrieve the branch type value. For example, a branch instruction type may be determined using a BTT in 1 to 3 processor cycles only, which is much faster than using a BCT based classification that requires indexing into the BCT as well as verification of a tag match for an entry.

Referring now to FIG. 4A, in an embodiment, BCT 401 may be a statistical table that stores the behavior of a conditional branch instruction and its prediction using a confusion matrix (the confusion matrix may be used to describe the performance of a classification or a prediction model). The BCT table 401 may be direct mapped, set-associative, or n-way set associative cache of branch classification information, generally organized as a table. Alternatively, any other desired configuration may be employed. FIG. 4A illustrates an example of a 8-way set-associative table.

Referring back to FIG. 4A, the BCT 401 is written with information about branches executed in pipelines of processor 102 (depicted in FIG. 2) where each entry in BCT 401 represents a branch instruction. The table of BCT 401 may be indexed with instruction virtual address bits that determine the BCT set/row. Additional branch instruction address bits may be stored within the BCT entry as Btag bits (411). In an embodiment, the Btag 411 may be a tag extracted from the instruction address corresponding to the branch instruction. The Btag may be extracted from the instruction address using methods now or hereafter known to those skilled in the art such as, without limitation, using one or more significant bits, using an xor operation, or the like. In an example embodiment, the Btag may be an 11 bits tag extracted from the instruction address after right shifting 6 bits. Each set/row of the BCT 401 may further include multiple ways/ columns. It should be understood that the number of index bits and tag bits will depend on the type of BCT table (fully associative, set-associative, or direct mapped), and for a fully associative BCT, index bits are not required. It will be understood to those skilled in the art that branch classification methods may work without the tag field in a direct BCT, but it may lead to reduced classification accuracy. The advantage of Tag field is to improve the accuracy and precision of the classification by finding whether a particular entry matches the program counter (PC) used to index the entry, although it does not need to match all the bits of the PC.

As shown in FIG. 4A, BCT 401 also includes a confusion matrix 412 (described below), a current branch outcome bit (CB) field 413 and a branch switch count (BSC) field 414. An exemplary confusion matrix 412 for actual versus predicted outcomes of a branch is shown in FIG. 5. As is known to those skilled in the art, a confusion matrix is a summary of prediction results on a classification problem. The number of correct and incorrect predictions are summarized with count values and broken down by each class. As shown in FIG. 5, the confusion matrix includes 4 fields: "Actual Taken/Predicted Taken" (T/T) 412(*a*), "Actual Not Taken/Predicted Taken" (NT/T) 412(*c*), "Actual Taken/Predicted Not Taken (T/NT)" 412(*b*), and "Actual Not Taken/Predicted Not Taken" (NT/NT) 412(*d*). Each of the fields in the confusion matrix 412 can store a 6-bits value. In an embodiment, the CB field 413 is a 1-bit field that is assigned a value 1 if the branch is taken, and is assigned a value 0 if the branch is not taken. The BSC field 414 is a 7-bit field that counts the number of times a branch changes direction which gets incremented whenever the previous branch direction and current branch direction mismatch (i.e., whenever a branch changes direction from taken to not taken or from not taken to taken). In an embodiment, BCT 401 shown in FIG. 4A may also include a usefulness bits (U bits) field 415. In an embodiment, the U bits field 416 is a 2-bit field that is indicative of how often a branch instruction is executed, i.e., the usefulness of a branch. Usefulness tracking enables efficient use of space in a BCT table by identifying dormant branch instruction entries that are used infrequently and which may be replaced (i.e., have minimal operational usefulness). In an embodiment, each new branch that does not have a corresponding entry in the BCT is initially assumed to be a simple branch.

It should be understood that the number of fields and the bit size of each field in the BCT 401 is provided as an example, and other bit sizes are within the scope of this disclosure in order to change, for example, precision and/or accuracy of classification, number of types of branches, branch characteristics, processing times, or the like. For example, in an embodiment shown in FIG. 4B, the confusion matrix 412 in BCT 401 of FIG. 4A may be replaced with 2 fields (a correct prediction field and a misprediction field) for classifying branches into simple branches and hard-to-predict branches only (discussed below).

Referring now to FIG. 4B, in an alternate embodiment, the BCU unit may include a BCT 420 configured to classify branches into simple branches and hard-to-predict branches only. The BCT table 420 may be direct mapped, set-associative, or n-way set associative cache of branch classification information, generally organized as a table. Alternatively, any other desired configuration may be employed. FIG. 4B illustrates an 8-way set-associative BCT table that combines the features of a fully associative scheme and a direct mapped scheme.

In an embodiment, BCT 420 is written with information about branches executed in pipelines of processor 102 (depicted in FIG. 2) where each entry in BCT 420 represents a branch instruction. The table of BCT 420 may be indexed with instruction virtual address bits that determine the BCT set/row. For example, in an embodiment, BCT 420 may be indexed by the combination of several branch characteristics, for example: the past local target history and the current program counter. For example, in an embodiment, 6 bits of instruction address are used as an index into the BCT 420. In other words, in an 8-way associative BCT table that has 64 entries, 6 bits of instruction may be used to index into the BCT. In an example embodiment, the 6 bits may be generated by extracting 12 bits after right shifting 6 bits of the instruction address, and dividing the 12 bits into two separate 6 bits. The two separate 6 bits may be XORed to obtain a 6 bit index for the BCT. In some embodiments, additional branch instruction address bits may be stored within the BCT 420 entry as Btag bits (421). In an embodiment, the Btag 421 may be a 10 bit tag extracted from the instruction address corresponding to the branch instruction (for e.g., by right shifting 6 bits). Each set/row of the BCT 420 may further include multiple ways/columns. It should be understood that the number of index bits and tag bits will depend on the type of BCT table (fully associative, set-associative, or direct mapped). It will be understood to those skilled in the art that branch classification methods may work without the tag field in the BCT, but it may lead to reduced classification accuracy, as discussed above.

As shown in FIG. 4B, BCT 420 also includes a correct prediction field 422, a misprediction field 423, and a usefulness bits field (U-bits) 424. The correct prediction field 422 and the misprediction field 423 in the BCT 420 can store a 6-bit value. In an embodiment, the U bits field 424 is a 2-bit field that is indicative of how often a branch instruction is executed, i.e., the usefulness of a branch.

As shown in FIGS. 4A and 4B, BCU 418 also includes a branch type table (BTT) 450. In an embodiment, a BTT 450 may be a direct mapped statistical table where each entry in BTT 450 represents a branch instruction that stores the classification of conditional branch instructions (BType) 451. In an embodiment, a BTT table may store up to 4096 entries. The term direct mapped means that some number of bits of the input address are used to index into the memory, and the remaining bits are stored in the memory. In an embodiment, n number of bits of the instruction address may be used as an index into the BTT 450. It should be noted that in a direct-mapped BTT, it is possible to discard the tag and tag storage associated with each cache entry. In essence, when a cache look-up accesses a selected entry, it is assumed that the tag and look-up address match. Classification information for a branch instruction, i.e., a valid cache entry associated with the instruction, is created only after a branch is encountered at least once and continues to exist in the cache only until replaced by a set of prediction information for another branch (discussed below). It will be understood that while the BTT shown in FIGS. 4A and 4B is organized as a direct mapped table, any other desired configuration may be employed depending on the design and implementation size requirements.

In an embodiment, the Btype field 451 may be a 3-bit field where a simple branch is assigned a [000] value, a static taken branch is assigned a [001] value, static not taken branch is assigned a [010] value, a flip flop HTP is assigned a [100] value, a dynamic HTP is assigned a value, a positive biased HTP is assigned a [101] value, a negative biased HTP is assigned a value, and a normal HTP is assigned a [111]

value (for the BTT of FIG. 4A). In an alternate embodiment, the Btype field 451 may be a 1-bit field where a simple branch is assigned a "0" value and an HTP branch is assigned a "1" value (for the BTT of FIG. 4B).

In an embodiment, the BTT 450 may also store a corresponding confidence counter value (Conf field) 452 relating to the classification, whose value varies from zero to N. Typically, this is implemented as a binary saturating counter. For example, if a 3-bit saturating counter is used, the possible values of the counter are [0, 1, 2, 3, 4, 5, 6, 7]. The output of the counter can be used to decide the course of action.

Figure 6A:
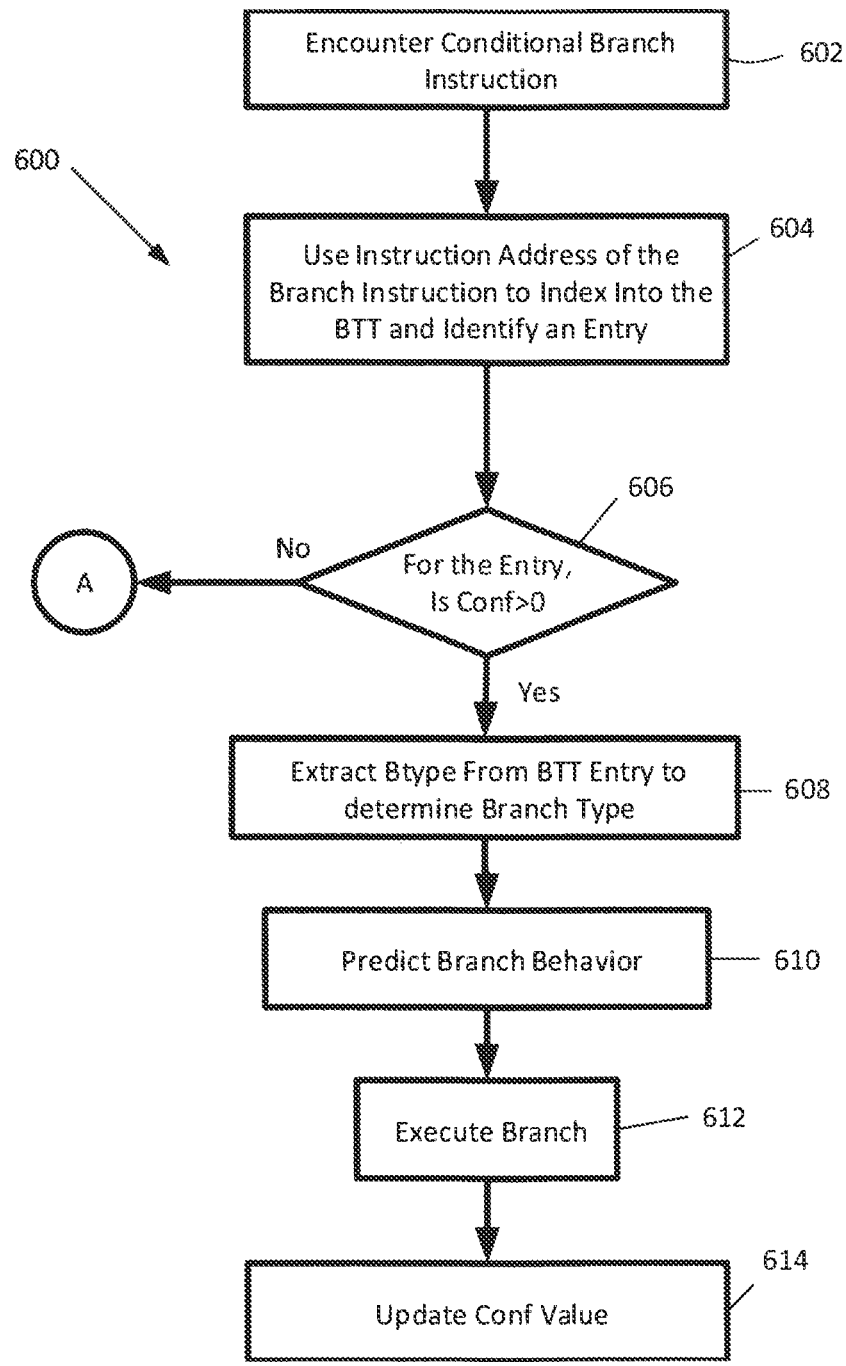
FIGS. 6A & 6B illustrate an example flowchart describing a method for detection of hard-to-predict branches using a branch type table and a branch type table of FIG. 4B in accordance with an embodiment.
Figure 6B:
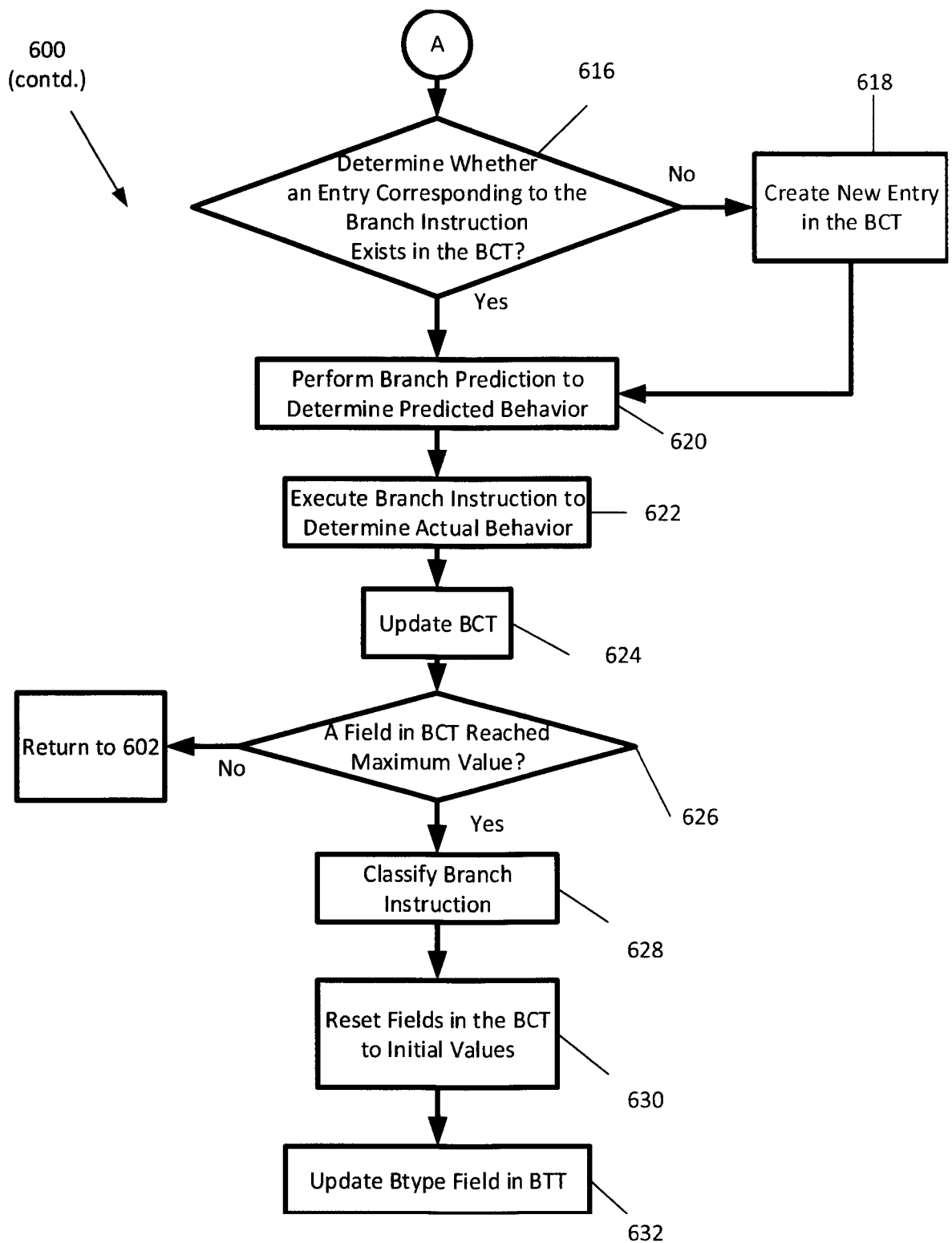

FIGS. 6A & 6B illustrate an exemplary flowchart in accordance with one embodiment describing a method for detecting hard-to-predict instruction branches, preferably using the BCU described above in FIG. 4B. While the classification method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 6A & 6B, but the process may be integrated and/or one or more steps may be performed together, or the steps may be performed in the order disclosed or in an alternate order.

While the illustrative embodiments described above are preferably implemented in hardware, such as in functional units of a processor, various aspects of the illustrative embodiments may be implemented in software as well. For example, it will be understood that each block of the flowchart illustration in FIGS. 6A & 6B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

At 602, the instruction fetch unit may encounter a conditional branch instruction for execution and may transfer it to the branch predictor for classification and prediction. At 604, the BCU of the branch predictor may then use the instruction address of the branch instruction (received from a PC, or another suitable directory) to index into the BTT and identify an entry corresponding to the branch instruction. For example, a suitable number of bits extracted from the instruction address (e.g., 12 bits) may be used to index into the BTT.

At 606, the system preferably determines whether the Conf value in the entry corresponding to the branch instruction is greater than 0 (606). If the Conf value is determined to be greater than zero (606: YES), then the Btype value (which is an indication of the branch type) is extracted from the BTT entry at 608 to determine the branch type. Once the branch type is determined, the method may continue to update the BTT as described below in steps 610-614.

At 610, the branch instruction and the Btype value is transferred to the branch predictor and branch prediction may be performed. At 612, the branch instruction may be executed to determine the actual behavior of the branch instruction. It should be noted that one of the advantages of the present disclosure is that branch classification value from the BTT (for existing as well as newly created entries), i.e., the Btype value, may be used during branch prediction to optimize the prediction process. For example, in an embodiment, the Btype value may be used by the branch predictor to identify a suitable branch prediction method for the branch instruction. This feature can be particularly valuable in dynamically optimizing branch prediction and execution of the branch instruction while the classification process is running.

At 614, after execution of the branch instruction, the BCU may update the Conf value of the entry corresponding to the branch instruction in the BTT. In an embodiment, the system may update the Conf value using the Btype value for the branch instruction. The system may increment the Conf value by 1 if the branch type is simple (i.e., Btype=0) and the predicted branch direction matches the actual branch direction and/or if the branch type is HTP (i.e., Btype=1) and the predicted branch direction does not match the actual branch direction. The system may decrement (or decrease) the Conf value by 1 if the branch type is simple (i.e., Btype=0) and the predicted branch direction does not match the actual branch direction and/or if the branch type is HTP (i.e., Btype=1) and the predicted branch direction matches the actual branch direction.

If at 606, the Conf value is determined to be equal to zero (606: NO), at 616 the system may extract a tag (e.g., 6 bits XOR 6 bits) from the instruction address of the branch instruction, and use the extracted tag to determine whether or not an entry corresponding to the branch instruction already exists in the BCT. If at 616 it is determined that an entry corresponding to the branch instruction does not exist in the BCT (616: NO), then the system may create (618) a new entry corresponding to the branch instruction using the extracted tag. In an embodiment, if the BCT is full, the system may search for an entry corresponding to a branch instruction that has a Ubits value=0, and may create the new entry by replacing the entry that has U bits value=0. Alternatively and/or additionally, if the BCT is full, and none of the entries in the BCT have a U bits value=0, the system may decrement the Ubits value of all entries in the BCT by 1.

However, if at 616 it is determined an entry corresponding to the branch instruction exists in the BCT (616: YES), then the branch instruction is transferred to the branch predictor and branch prediction may be performed at 620. At 622, the branch instruction may be executed to determine the actual behavior of the branch instruction.

Upon execution of the branch instruction, at 624, the BCT may be updated based on the predicted and actual behavior of the branch instruction. For updating the BCT, if the predicted behavior of the branch matches the actual behavior, the correct prediction field is incremented by 1, and if the predicted behavior of the branch does not match the actual behavior, the misprediction field is incremented by 1. At 626, the system may determine whether the correct prediction field or the misprediction field has reached a maximum value. If at 626 it is determined that a field in the BCT has hit the maximum value (626: YES), then the system may classify the branch instruction (628) as discussed below. However, if at 626 it is determined that none of the fields in the BCT have hit the maximum value (626: NO), then the process repeats from 602.

At 628, the system classifies the branch instruction by computing various classifier parameters based on the values in the BCT, and by applying a set of rules discussed below in Table 1. Various classifier parameters are calculated as shown:

Branch Count (BC)=Misprediction counter value+ Correct prediction counter value;

Miss-prediction rate (U)=Misprediction counter value/BC; and

Accuracy (A)=Correct prediction counter value/BC.

TABLE 1

| Branch Type | Rules |
| --- | --- |
| Hard to Predict | If Accuracy < Threshold |
| Simple | Else |

In an embodiment, the threshold value used for classifying the branches may be used to control the aggressiveness of BCT and hence may be configured based on the workload of the processor. For example, a threshold of about 80% to about 90% may be used for more aggressive classification in order to identify branches which have a prediction accuracy of less than about 80% to about 90%. In another example, a threshold of about 55% to about 65% may be used for less aggressive classification in order to identify branches which have a prediction accuracy of less than about 55% to about 65%.

It should be noted that the above branch classification rules are provided as an example, and may be varied according to the needs of the workloads of the processor, domain served, applications, real estate availability, power budget, accuracy requirements, processing times, characteristics of various branch types, number of branch types, or the like, and the BCU may be configured with the desired set of rules.

At 630, the fields in the misprediction field, the correct prediction field and the U bits field may be reset to their initial values (i.e., "0").

At 632, once a branch instruction is classified, the Btype field in the BCT and/or the BTT corresponding to the branch instruction may be updated to reflect the value corresponding the branch type. In an embodiment, every time a Btype field corresponding to a branch instruction in the BTT is updated, the corresponding Conf value may also be updated to assign a maximum value (e.g., 7 for a 3-bit counter).

Figure 7A:
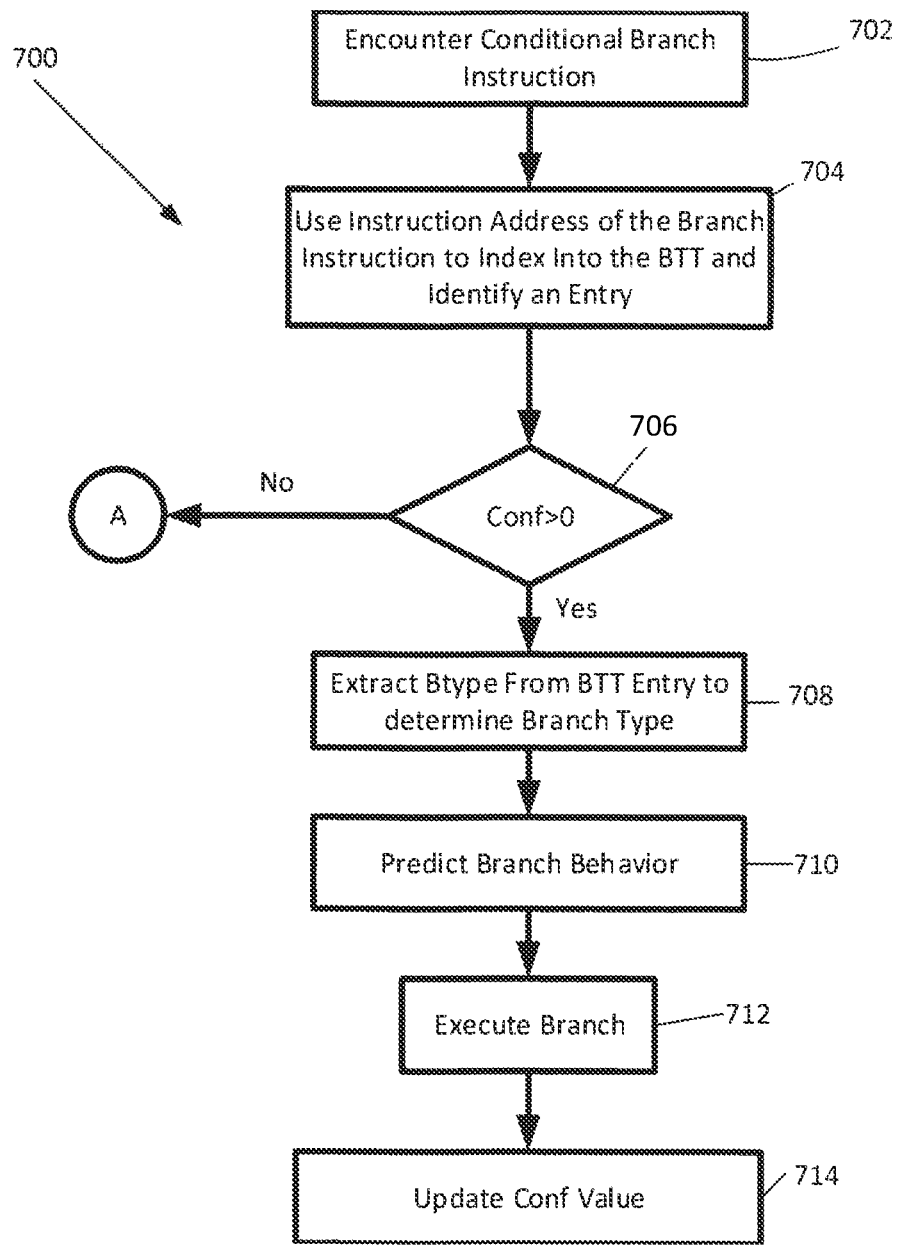
FIGS. 7A & 7B illustrate an example flowchart describing a method for detection of hard-to-predict branches using a branch type table and a branch classification table of FIG. 4A in accordance with an embodiment.
Figure 7B:
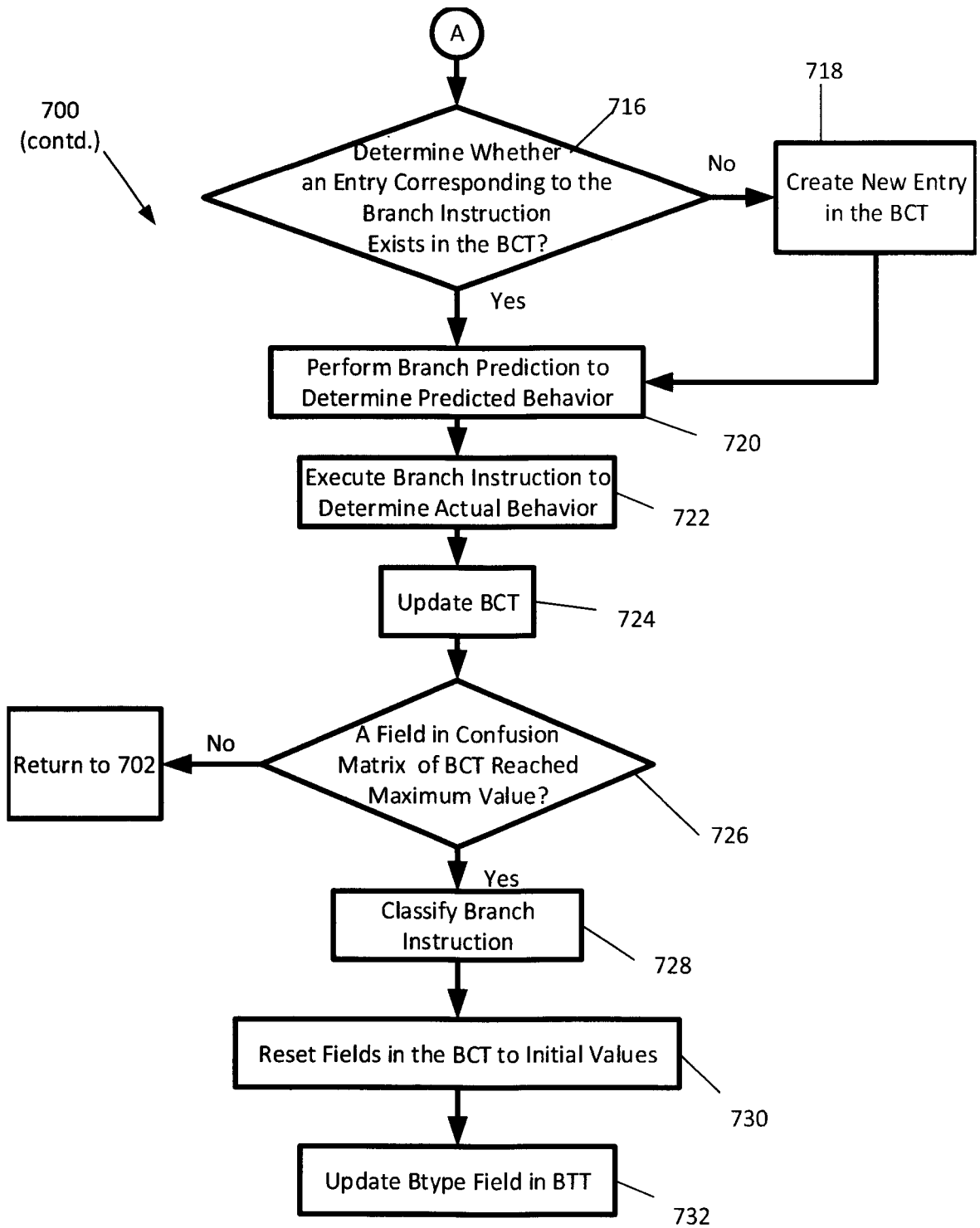

FIGS. 7A & 7B illustrate an exemplary flowchart in accordance with one embodiment describing a method for detecting hard-to-predict instruction branches, preferably using the BCU described above in FIG. 4A. While the classification method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 7A & 7B, but the process may be integrated and/or one or more steps may be performed together, or the steps may be performed in the order disclosed or in an alternate order.

While the illustrative embodiments described above are preferably implemented in hardware, such as in functional units of a processor, various aspects of the illustrative embodiments may be implemented in software as well. For example, it will be understood that each block of the flowchart illustration in FIGS. 7A & 7B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

At 702, the instruction fetch unit may encounter a conditional branch instruction for execution and may transfer it to the branch predictor for classification and prediction. At 704 the BCU of the branch predictor may then use the instruction address of the branch instruction (received from a PC, or another suitable directory) to index into the BTT and identify an entry corresponding to the branch instruction. For example, a suitable number of bits extracted from the instruction address (e.g., 12 bits) may be used to index into the BTT.

At 706, the system determines whether the Conf value in the identified entry corresponding to the branch instruction is greater than 0. If the Conf value is determined to be greater than zero (706: YES), then the Btype value (which is an indication of the branch type) is extracted from the BTT entry at 708 to determine the branch type. Once the branch type is determined, the method may continue to update the BTT as described below in steps 710-714.

At 710, where the branch instruction and the Btype value is transferred to the branch predictor and branch prediction may be performed. At 712, the branch instruction may be executed to determine the actual behavior of the branch instruction. It should be noted that one of the advantages of the present disclosure is that branch classification value from the BTT (for existing as well as newly created entries), i.e., the Btype value, may be used during branch prediction to optimize the prediction process. For example, in an embodiment, the Btype value may be used by the branch predictor to identify a suitable branch prediction method for the branch instruction. This feature can be particularly valuable in dynamically optimizing branch prediction and execution of the branch instruction while the classification process is running.

At 714, after execution of the branch instruction, the system may update the Conf value of the entry corresponding to the branch instruction in the BTT. In an embodiment, the system may update the Conf value using the Btype value for the branch instruction and by decrementing the Conf value by 1 if one of the following conditions is satisfied:
(i) Btype=Simple and the predicted branch direction does not match the actual branch direction (i.e., mispredicted);
(ii) Btype=Static taken branch and mispredicted and actual prediction is "not taken";
(iii) Btype=Static not taken branch and mispredicted and actual prediction is "taken";
(iv) Btype==Biased positive HTP and actual prediction is "not taken";
(v) Btype==Biased negative HTP and actual prediction is "taken"; and
(vi) Btype=HTP and the predicted branch direction matches the actual branch direction (i.e., correct prediction).

If at 706, the Conf value is determined to be equal to zero (706: NO), at 716 the system may extract a tag from the instruction address of the branch instruction, and use the extracted tag to determine whether or not an entry corresponding to the branch instruction already exists in the BCT. If at 716 it is determined that an entry corresponding to the branch instruction does not exist in the BCT (716: NO), then the system may create (718) a new entry corresponding to the branch instruction using the extracted tag. In an embodiment, the branch type for the new entry is assumed to be a simple branch initially and other initial values may be assigned, and the process moves to 720. In an embodiment, for each newly created entry, the fields in the confusion matrix are initially assigned a [000000] value, the CB field is assigned a value [0] (i.e., not taken) or a value [1] (i.e., taken) based on the current branch behavior, the BSC field is assigned a [0000000] value, and the U-bits field are assigned values [00] each. In an embodiment, if the BCT is full, the system may search for an entry corresponding to a branch instruction that has a Ubits value=0, and may create the new entry by replacing the entry that has U bits value=0. Alternatively and/or additionally, if the BCT is full, and none of the entries in the BCT have a U bits value=0, the system may decrement the Ubits value of all entries in the BCT by 1.

However, if at 716 it is determined an entry corresponding to the branch instruction exists in the BCT (716: YES), then the branch instruction is transferred to the branch predictor and branch prediction may be performed at 720. At 722, the branch instruction may be executed to determine the actual behavior of the branch instruction.

Upon execution of the branch instruction, at 724, one or more fields in the BCT may be updated based on the predicted and actual behavior of the branch instruction. In an embodiment, the four fields of the confusion matrix in the BCT may be updated based on the predicted and actual behavior of the branch instruction. For updating the confusion matrix, if the prediction for the branch instruction was taken and the branch was actually taken, the value in the field 412(*a*) (T/T) is incremented by 1, if the prediction for the branch instruction was not-taken and the branch was actually taken, the value in the field 412(*c*) (NT/T) is incremented by 1, if the prediction for the branch instruction was taken and the branch was actually not-taken, the value in the field 412(*b*) (T/NT) is incremented by 1, and if the prediction for the branch instruction was not-taken and the branch was actually not-taken, the value in the field 412(*d*) (NT/NT) is incremented by 1. In an embodiment, the CB field and the BSC fields of the BCT may also be updated. In an embodiment, the CB field is assigned a value "1" if the branch instruction is actually taken and a value "0" if the branch instruction is actually not-taken. In an embodiment, the BSC field is updated to increment its value by 1 every time a branch instruction changes direction (i.e., there is a mismatch between the previous branch direction and the current branch direction). In other words, the BSC field is updated to increment its value by 1 whenever a branch instruction changes direction from taken to not taken and/or from not taken to taken from the most recent execution to the current execution of the branch instruction.

At 726, the system may determine whether a field in the confusion matrix has reached a maximum value. It should be understood to those skilled in the art that since the fields in the confusion matrix are 6-bit, the maximum value will be 64. If at 726 it is determined that a field in the confusion matrix has hit the maximum value (726: YES), then the system classifies the branch instruction (728) as discussed below. However, if at 726 it is determined that none of the fields in the confusion matrix have hit the maximum value (726: NO), then the process repeats from 702.

At 732, the system classifies the branch instruction by computing various classifier parameters based on the values in the BCT, and by applying a set of rules shown in Table 2. Various classifier parameters are calculated as shown:

Branch Count $(BC)=T/T+NT/T+T/NT+NT/NT$;

Miss-prediction rate $(U)=(T/NT+NT/T)/(BC)$;

Accuracy $(A)=[(T/T+NT/NT)/BC]*100$;

Taken count $(TC)=T/T+T/NT$;

Not-Taken Count $(NTC)=NT/T+NT/NT$;

True Positive Branch $(TPB)=TC/BC$;

True Negative Branch $(TNB)=NTC/BC$;

Max Switch Count$=2*\min(TC,NTC)$;

Switch Probability$=(BSC)/$(Max Switch Count);

Total Positive Prediction: $T/T+NT/T$;

Total Negative Prediction: $T/NT+NT/NT$;

Positive Prediction Rate: $(T/T)/(TC)$; and

Positive Negative Rate: $(NT/NT)/(NTC)$.

TABLE 2

| Branch Type | Rules |
| --- | --- |
| Static Taken Branch | If true_positive_branch == 1 |
| Statin Not Taken Branch | If true_negative_branch == 1 |
| Flip Flop HTP | If accuracy < THRESHOLD and Switch-count-probability > 0.9 |
| Dynamic HTP | If accuracy < THRESHOLD and Switch-count-probability <0.7, 0.9> |
| Biased Positive HTP | If (positive_prediction_rate-accuracy) > 0.10 : |
| Biased Negative HTP | If (negative_prediction_rate-accuracy) > 0.10 : |
| Other HTP | If accuracy < THRESHOLD |
| Simple Easy to predict Branch | Else |

In an embodiment, the threshold value used for classifying the branches may be used to control the aggressiveness of BCT and hence may be configured based on the workload of the processor. For example, a threshold of about 80% to about 90% may be used for more aggressive classification in order to identify branches which have a prediction accuracy of less than about 80% to about 90%. In another example, a threshold of about 55% to about 65% may be used for less aggressive classification in order to identify branches which have a prediction accuracy of less than about 55% to about 65%.

It should be noted that the above branch classification rules are provided as an example, and may be varied according to the needs of the workloads of the processor, domain served, applications, real estate availability, power budget, accuracy requirements, processing times, characteristics of various branch types, number of branch types, or the like, and the BCU may be configured with the desired set of rules. For example, a branch may be classified as a flip flop HTP if accuracy <THRESHOLD and Switch-count-probability >a value of about 0.8 to about 0.95. In another example, a branch may be classified as a dynamic HTP if accuracy <THRESHOLD and Switch-count-probability is less 0.6+X and greater than 0.9−Y, where X and Y may be optimized to achieve a desired result such as accuracy, precision, etc.

At 730, the fields in the confusion matrix and the BSC field may be reset to their initial values. At 732, once a branch instruction is classified, the Btype field in the BCT and/or the BTT may be updated to reflect the value corresponding the determined branch type. In an embodiment, every time a Btype field corresponding to a branch instruction in the BTT is updated, the corresponding Conf value may also be updated to assign a maximum value (e.g., 7 for a 3-bit counter).

It will be understood to those skilled in the art that while in the methods and systems described above, a BTT is used to determine a branch instruction type if the conf value is greater than 0 and a BCT is used to classify a branch instruction if the conf value is equal to 0, the conf value may be compared with other integer values such as 1, 2, 3, etc. to make the determination regarding the table that should be used for classification of the branch type.

It will be understood to those skilled in the art that the systems and methods described in this disclosure optimize the branch classification logic of a processor by allowing branch classification to be efficiently performed using a low-overhead lookup function (the direct mapped BTT), while maintaining benefits of using the more complex caches (e.g., set-associative mapped BCT) for previously unclassified branch instructions.

In an embodiment, the system and method for classification of branch instructions as described above may be used to improve handling of hard to predict indirect branches. For example, in an embodiment, if a branch instruction is determined to be a hard to predict branch using the BTT, the system may not invoke branch prediction, and may fetch instructions from both directions (i.e., taken and not taken) to initiate two streams of execution. In other words, branch prediction may only be invoked for branches classified as simple using the BTT and/or the BCT.

In an exemplary embodiment, where the BCU of FIG. 3 is implemented in hardware, the methods described herein, such as process 600 and/or 700, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor comprising:
   a processor pipeline comprising one or more execution units configured to execute one or more branch instructions;
   a branch predictor coupled to the processor pipeline and configured to predict an outcome of each of the one or more branch instructions; and
   a branch classification unit associated with the processor pipeline and the branch predictor, and configured to classify each of the one or more branch instructions as at least one of the following: a simple branch and a hard-to-predict branch, wherein the branch classification unit comprises a direct-mapped branch type table (BTT) and a branch classification table (BCT),
   wherein the BTT comprises one or more entries, wherein each of the one or more entries further includes a branch type BTT field and a confidence counter BTT field, and
   wherein the branch classification unit is configured to, in response to detecting a first branch instruction, determine a type of the first branch instruction by:
      extracting an index from an instruction address of the first branch instruction;
      using the index to identify a BTT entry in the BTT corresponding to the first branch instruction;
      determining whether a value in the confidence counter BTT field in the identified BTT entry is greater than 0; and
      if the value in the confidence counter BTT field in the identified BTT entry is greater than 0:

determining the type of the first branch instruction using a value in the branch type BTT field of the identified BTT entry;

predicting, by the branch predictor, a predicted outcome of the first branch instruction; and, updating the value of the confidence counter BTT field in the identified BTT entry based on an actual outcome of the first branch instruction and the predicted outcome of the first branch instruction using one or more of the following rules:

increment the value in the confidence counter BTT field in the identified BTT entry by 1 if the branch type BTT field in the identified BTT entry indicates simple and the predicted outcome of the first branch instruction matches the actual outcome of the first branch instruction, increment the value in the confidence counter BTT field in the identified BTT entry by 1 if the branch type BTT field in the identified BTT entry indicates hard to predict and the predicted outcome of the first branch instruction does not match the actual outcome of the first branch instruction, decrement the value in the confidence counter BTT field in the identified BTT entry by 1 if the branch type BTT field in the identified BTT entry indicates simple and the predicted outcome of the first branch instruction does not match the actual outcome of the first branch instruction, and decrement the value in the confidence counter BTT field in the identified BTT entry by 1 if the branch type BTT field in the identified BTT entry indicates hard to predict and the predicted outcome of the first branch instruction matches the actual outcome of the first branch instruction.

2. The processor of claim 1, wherein the BCT comprises one or more BCT entries, wherein each of the one or more BCT entries includes a BCT bit field configured to record an actual outcome of a respective branch instruction and a BCT field configured to record a predicted outcome of the respective branch instruction.

3. The processor of claim 2, wherein the one or more BCT entries of the BCT includes a plurality of BCT entries, and the plurality of the BCT entries are organized as a direct-mapped table, a fully associative table, or an n-way set associative table.

4. The processor of claim 1, wherein the BCT comprises one or more BCT entries, wherein each of the one or more BCT entries includes a plurality of BCT fields, and the plurality of BCT fields include a tag field, a confusion matrix, a current branch outcome field, a branch switch count field, and a usefulness bits field.

5. The processor of claim 1, wherein the BCT comprises one or more BCT entries, wherein each of the one or more BCT entries includes a plurality of BCT fields, and the plurality of BCT fields include a tag field, a correct prediction field, a misprediction field, and a usefulness bits field.

6. The processor of claim 1, wherein the branch classification unit is further configured to, if the value in the confidence counter BTT field in the identified BTT entry is equal to 0, use the BCT to classify the first branch instruction.

7. The processor of claim 6, wherein the BCT is configured to classify the first branch instruction by:

updating one or more BCT fields of the BCT to record the actual outcome and the predicted outcome of the first branch instruction;

computing a set of classifier parameters using a BCT value included in the updated BCT;

classifying the first branch instruction based on the set of classifier parameters; and updating the branch type BTT field in the identified BTT entry in the BTT.

8. The processor of claim 1, wherein the branch predictor is configured to predict an outcome of the first branch instruction only if the value in the branch type BTT field of the identified BTT entry indicates a simple branch.

9. A computing system comprising:

a memory; and a processor, wherein the processor comprises:

a processor pipeline comprising one or more execution units configured to execute one or more branch instructions;

a branch predictor associated with the processor pipeline and configured to predict an outcome of each of the one or more branch instructions; and a branch classification unit coupled to the processor pipeline and the branch predictor, and configured to classify each of the one or more branch instructions as at least one of the following: a simple branch and a hard-to-predict branch, wherein the branch classification unit comprises a direct-mapped branch type table (BTT), wherein the BTT comprises one or more BTT entries, wherein each of the one or more BTT entries includes a branch type BTT field and a confidence counter BTT field; and, wherein, the branch classification unit is configured to, in response to detecting a first branch instruction, determine a type of the first branch instruction by:

extracting an index from an instruction address of the first branch instruction;

using the index to identify a BTT entry corresponding to the first branch instruction in the BTT;

determining whether a value in the confidence counter BTT field in the identified BTT entry is greater than 0; and if the value in the confidence counter BTT field in the identified BTT entry is greater than 0:

determining the type of the first branch instruction using a value in the branch type BTT field of the identified BTT entry by predicting, by the branch predictor, a predicted outcome of the first branch instruction, and updating the value in the confidence counter BTT field based on an actual outcome and the predicted outcome of the first branch instruction using one or more of the following rules:

increment the value in the confidence counter BTT field in the identified BTT entry by 1 if the branch type BTT field in the identified BTT entry indicates simple and the predicted outcome of the first branch instruction matches the actual outcome of the first branch instruction, increment the value in the confidence counter BTT field in the identified BTT entry by 1 if the branch type BTT field in the identified BTT entry indicates hard to predict and the predicted outcome of the first branch instruction does not match the actual outcome of the first branch instruction, decrement the value in the confidence counter BTT field in the identified BTT entry by 1 if the branch type BTT field in the identified BTT entry indicates simple and the predicted outcome of the first branch instruction does not match the actual outcome of the first branch instruction, and decrement the value in the confidence counter BTT field in the identified BTT entry by 1 if the branch type BTT field in the identified BTT entry indicates hard to predict and the predicted outcome of the first branch instruction matches the actual outcome of the first branch instruction.

10. The computing system of claim 9, wherein the branch classification unit further comprises a branch classification table (BCT), wherein the BCT comprises one or more BCT entries, wherein each of the one or more BCT entries includes a BCT field configured to record an actual outcome of a respective branch instruction and a BCT field configured to record a predicted outcome of the respective branch instruction.

11. The computing system of claim 10, wherein each of the one or more BCT entries includes a plurality of BCT fields, and the plurality of BCT fields include a tag field, a correct prediction field, a misprediction field, and a usefulness bits field.

12. The computing system of claim 9, wherein the branch classification unit is further configured to, if the value in the confidence counter BTT field in the identified BTT entry is equal to 0, use a branch classification table (BCT) to classify each of the first branch instruction.

13. The computing system of claim 12, wherein the BCT is configured to classify the first branch instruction by:
updating one or more fields of the BCT to record the actual outcome and the predicted outcome of the first branch instruction;
computing a set of classifier parameters using a BCT value included in the updated BCT;
classifying the first branch instruction based on the set of classifier parameters; and
updating the branch type BTT field in the identified BTT entry in the BTT.

14. A computing system comprising:
a memory; and
a processor, wherein the processor comprises:
a processor pipeline comprising one or more execution units configured to execute one or more branch instructions;
a branch predictor coupled to the processor pipeline and configured to predict an outcome of each of the one or more branch instructions; and
a branch classification unit associated with the processor pipeline and the branch predictor, and configured to classify each of the one or more branch instructions as at least one of the following: a simple branch and a hard-to-predict branch, wherein the branch classification unit comprises a direct-mapped branch type table (BTT) and a branch classification table (BCT), and
wherein the BTT comprises one or more BTT entries, wherein each of the one or more BTT entries includes a branch type BTT field and a confidence counter BTT field, and
wherein the branch classification unit is configured to, in response to detecting a first branch instruction, determine a type of the first branch instruction by:
using an index to identify a BTT entry in the BTT corresponding to the first branch instruction;
determining whether a value in the confidence counter BTT field in the identified BTT entry is greater than a threshold; and if the value in the confidence counter BTT field in the identified BTT entry is less than or equal to the threshold, using the BCT to classify the first branch instruction, wherein the BCT is configured to classify the first branch instruction by:
updating a field in the BCT to record an actual outcome of the first branch instruction and updating a field in the BCT to record a predicted outcome of the first branch instruction;
computing a set of classifier parameters using a BCT value included in the updated BCT;
classifying the first branch instruction based on the set of classifier parameters; and
updating the branch type BTT field in the identified BTT entry in the BTT.

15. The computing system of claim 14, wherein if the value in the confidence counter BTT field in the identified BTT entry is greater than the threshold, the branch classification unit determines the type of the first branch instruction using a value in the branch type BTT field of the identified BTT entry.

16. The computing system of claim 14, wherein the BCT comprises one or more BCT entries, wherein each of the one or more BCT entries includes a BCT bit field to record an actual outcome of a respective branch instruction and a BCT bit field to record a predicted outcome of the respective branch instruction.

17. The computing system of claim 16, wherein the one or more BCT entries of the BCT includes a plurality of BCT entries, and the plurality of the BCT entries are organized as a direct-mapped table, a fully associative table, or an n-way set associative table.

18. The computing system of claim 16, wherein the BCT includes a plurality of BCT fields, and the plurality of BCT fields include a tag field, a correct prediction field, a misprediction field, and a usefulness bits field.

19. The computing system of claim 14, wherein the BCT includes a plurality of BCT fields, and the plurality of BCT fields include a tag field, a confusion matrix, a current branch outcome field, a branch switch count field, and a usefulness bits field.

20. The computing system of claim 14, wherein, if the value in the confidence counter BTT field in the identified BTT entry is greater than the threshold, the branch classification unit is configured to:
determine, based upon the predicted outcome of the first branch instruction, the type of the first branch instruction using a value in the branch type BTT field in the identified BTT entry, and
update the value in the confidence counter BTT field in the identified BTT entry based on the actual outcome and the predicted outcome of the first branch instruction using one or more of the following rules:
increment the value in the confidence counter BTT field in the identified BTT entry by 1 if the branch type BTT field in the identified BTT entry indicates simple and the predicted outcome of the first branch instruction matches the actual outcome of the first branch instruction,
increment the value in the confidence counter BTT field in the identified BTT entry by 1 if the branch type BTT field in the identified BTT entry indicates hard to predict and the predicted outcome of the first branch instruction does not match the actual outcome of the first branch instruction,
decrement the value in the confidence counter BTT field in the identified BTT entry by 1 if the branch type BTT field in the identified BTT entry indicates simple and the predicted outcome of the first branch instruction does not match the actual outcome of the first branch instruction, and decrement the value in the confidence counter BTT field in the identified BTT entry by 1 if the branch type BTT field in the identified BTT entry indicates hard to predict and the predicted outcome of the first branch instruction matches the actual outcome of the first branch instruction.

\* \* \* \* \*